D. G. WINCHESTER.
TROLLEY WIRE CLAMP.
APPLICATION FILED SEPT. 19, 1918.
1,309,870.
Patented July 15, 1919.
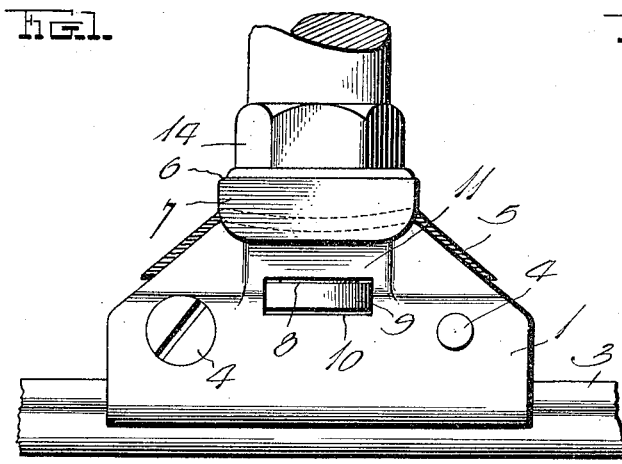
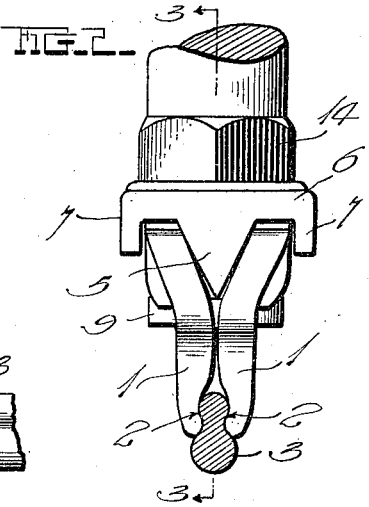
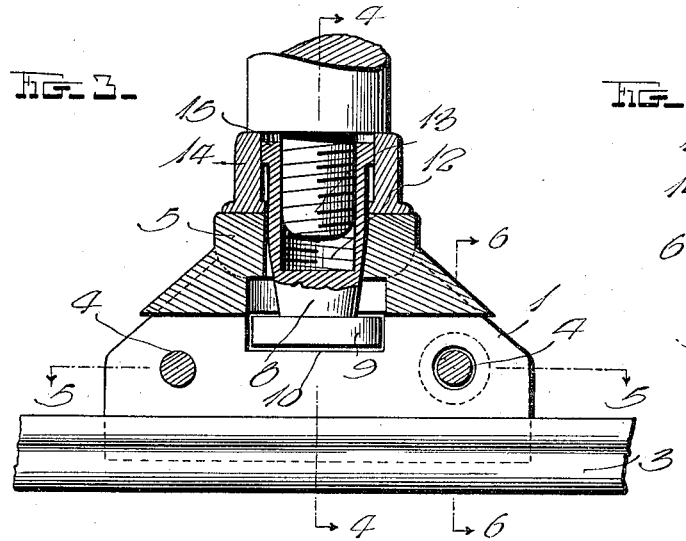
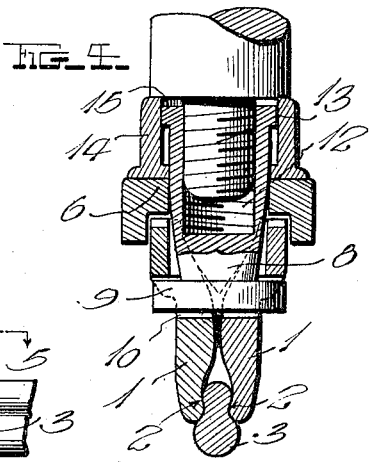
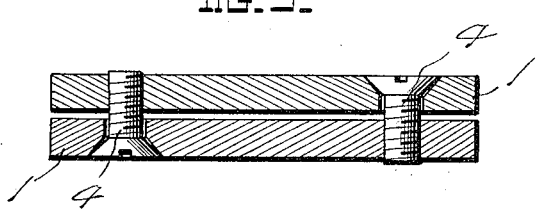
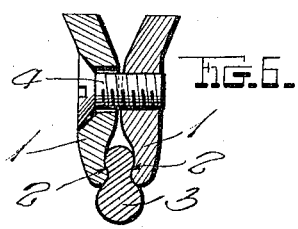
Witness
H. Woodard
Inventor
D. G. Winchester
By H. B. Willson &co.
Attorneys
THE COLUMBIA PLANOGRAPH CO., WASHINGTON, D. C.

UNITED STATES PATENT OFFICE.

DORSEY G. WINCHESTER, OF PRUDEN, TENNESSEE.

TROLLEY-WIRE CLAMP.

1,309,870. Specification of Letters Patent. Patented July 15, 1919.

Application filed September 19, 1918. Serial No. 254,808.

*To all whom it may concern:*

Be it known that I, DORSEY G. WINCHESTER, a citizen of the United States, residing at Pruden, in the county of Claiborne and State of Tennessee, have invented certain new and useful Improvements in Trolley-Wire Clamps; and I do declare the following to be a full, clear, and exact description of the invention, such as will enable others skilled in the art to which it appertains to make and use the same.

My invention has for its object to provide a trolley wire clamp of extreme simplicity which may be manufactured inexpensively, and which will be highly efficient and reliable in use.

With the foregoing object in view, the invention resides in the novel features of construction herein fully described and claimed, reference being made to the accompanying drawing.

Figure 1 is a side elevation of the clamp.

Fig. 2 is an end elevation thereof.

Fig. 3 is a vertical section on the plane of the line 3—3 of Fig. 2 with parts in elevation.

Fig. 4 is a vertical transverse section on the plane indicated by the line 4—4 of Fig. 3 with certain parts in elevation.

Fig. 5 is a horizontal section on the plane of the line 5—5 of Fig. 3.

Fig. 6 is a detail transverse section as indicated by the line 6—6 of Fig. 3.

In the drawings above briefly described, the numerals 1 designate two identical jaw plates which are preferably of the contour shown, the lower edges of said plates being shaped at 2 for snug engagement with opposite sides of the trolley wire 3, while the upper edge portions of said plates diverge upwardly as seen for instance in Fig. 2. Between their upper and lower edges, fasteners 4 extend through and between the ends of the plates 1 and have loose connection therewith so as to form fulcrums upon which the two plates may rock. The fasteners 4 are by preference screw threaded as shown so as to permit their operation to initially clamp the plates 1 around the wire 3. After this initial clamping, the final clamping is accomplished by means of a wedge 5 which is receivable between the diverging upper edge portions of the plates 1.

The wedge 5 is preferably provided with lateral flanges 6 which are in turn equipped with depending flanges 7, said flanges 6 extending outwardly over the upper edges of the plates 1, while the flanges 7 depend along the outer sides of said plates. A vertical bolt 8 is swiveled between the plates 1, the swivel connection being preferably formed by providing a circular head 9 on the lower end of said bolt and passing said head through slots 10 in the aforesaid plates, the central portions of the latter which are engaged by the head being preferably thickened as seen at 11. The bolt 8 rises through the wedge 5 and is provided in its upper end with a socket 12 internally threaded to receive the usual hanger stud 13 of the insulator (not shown). A well known form of polysided collar 14 is mounted slidably but nonrotatably on the upper end of the bolt 8, said collar bearing against the upper side of the wedge 5 and being adapted to engage a shoulder 15 on the stud 13 or any other preferred thrust abutment. When the collar 14 is rotated by a wrench or other suitable tool, the swiveled bolt 8 is so turned as to thread it upon the threaded stud 13, thus causing the collar to thrust downwardly upon the wedge 5 so that the upper edges of the jaw plates 1 are spread. This spreading of the upper edges of the plates correspondingly moves the lower edges thereof inwardly so that the wire 3 is tightly clamped.

I am aware that somewhat similar trolley wire clamps have heretofore been employed, but in so far as I am advised, such devices have not employed transverse fasteners such as 4 loosely engaged with the jaw plates to serve as fulcrums upon which the latter may rock when a wedge such as indicated at 5 is forced into place. By this general arrangement, the device may be constructed much more easily and inexpensively than when using a longitudinal pivot between the jaws, and when the fasteners 4 are screw threaded as shown, the initial clamping of the wire may be effected by tightening of such fasteners prior to forcing the wedge into place, and thus the clamping action may be more effectively carried out than otherwise. The two jaw plates 1 are identical in construction and both ends of the wedge 5 are of the same shape, as are also the flanges 6 and 7 along the sides of said wedge, thus insuring ease in assembling and manufacture, since it is unnecessary to contend with any "rights" and "lefts."

Since probably the best results are obtained from the details shown and described, they may be followed, but within the scope of the invention as claimed, numerous minor changes may well be made.

I claim:

1. In a trolley wire clamp, a pair of jaw plates for disposition on opposite sides of the wire, transverse fasteners extending through and between the ends of said jaw plates and having loose connection therewith to provide fulcrums on which said plates may rock, a wedge between the upper edges of said plates for rocking them in a manner to grip the wire between their lower edges, a bolt swiveled between said jaw plates and extending upwardly through said wedge, the upper end of said bolt having a threaded socket to receive a hanger stud, and a polysided collar slidable but nonrotatable on the upper end of said bolt for depressing said wedge when the collar is rotated to thread the bolt onto the hanger stud.

2. In a trolley wire clamp, a pair of jaw plates for disposition on opposite sides of the wire, transverse threaded fasteners passing through and between the ends of said jaw plates for initially clamping their lower edges against the wire, said fasteners having loose connection with said jaw plates whereby they may act as fulcrums upon which said plates may rock, a wedge between the upper edges of said jaw plates for rocking them to tightly clamp their lower edges against the wire, a bolt swiveled between said jaw plates and extending upwardly through said wedge, the upper end of said bolt having a threaded socket to receive a hanger stud, and a polysided collar slidable but nonrotatable on the upper end of said bolt for depressing said wedge when the collar is rotated to thread the bolt onto the hanger stud.

In testimony whereof I have hereunto set my hand.

DORSEY G. WINCHESTER.

Witnesses:
H. M. SNELLING,
LAN BAKER.

Copies of this patent may be obtained for five cents each, by addressing the "Commissioner of Patents, Washington, D. C."